United States Patent
Jahng et al.

(10) Patent No.: US 6,807,307 B2
(45) Date of Patent: Oct. 19, 2004

(54) CLUSTERING METHOD FOR ROSETTE SCAN IMGES

(76) Inventors: Surng Gahb Jahng, 1105-1505, Hugokmaeul, Ilsan-gu, Koyang-si, Kyungki-do (KR), 411-736; Hyun Ki Hong, 5-301, Shinhyang-villa, Joongkok-4-dong, Kwangjin-gu, Seoul (KR), 13-220; Jong Soo Choi, 209-2, Sangdo-5-dong, Dongjak-gu, Seoul (KR), 156-030

( * ) Notice: Subject to any disclaimer, the term of this patent is extended or adjusted under 35 U.S.C. 154(b) by 682 days.

(21) Appl. No.: 09/874,417

(22) Filed: Jun. 5, 2001

(65) Prior Publication Data

US 2002/0037106 A1 Mar. 28, 2002

(30) Foreign Application Priority Data

Aug. 10, 2000 (KR) ........................................ 2000-46430

(51) Int. Cl.⁷ ................................................ G06K 9/62
(52) U.S. Cl. ........................................ 382/225; 382/284
(58) Field of Search ................................ 382/103, 170, 382/181, 195, 224, 225, 284, 321

(56) References Cited

U.S. PATENT DOCUMENTS

| | | | | |
|---|---|---|---|---|
| 4,009,393 A | * | 2/1977 | Ashley et al. | 250/339.05 |
| 4,014,000 A | * | 3/1977 | Uno et al. | 382/203 |
| RE33,228 E | * | 6/1990 | Buchtel et al. | 250/203.6 |
| 5,088,659 A | * | 2/1992 | Neff et al. | 244/3.16 |
| 5,572,600 A | * | 11/1996 | Tajima et al. | 382/163 |
| 6,121,606 A | * | 9/2000 | Voigt et al. | 250/234 |
| 6,198,564 B1 | * | 3/2001 | Knight | 359/214 |

OTHER PUBLICATIONS

Schmitendorf, et al. "Robust tracking controller for a seeker scan loop", IEEE, pp. 282–288, Mar. 1999.*
"A New Indexing Method for Video Retrieval Using the Rosette Pattern", IEEE Transactions on Consumer Electronics, vol. 46, No. 3, Aug. 2000, pp. 780–784.
"Target Position Extraction Based on Instantaneous Frequency Estimatioin in a Fixed–Reticle Seeker", Optical Engineering, vol. 39, No. 9, Sep. 2000, pp. 2568–2573.
"New Infrared Counter–Countermeasure Technique Using an Iterative Self–Organizing Data Analysis Algorithm for the Rosette Scanning Infrared Seeker", Optical Engineering, vol. 39, No. 9, Sep. 2000, pp. 2397–2404.

* cited by examiner

Primary Examiner—Daniel Mariam
(74) Attorney, Agent, or Firm—Schweitzer Cornman Gross & Bondell LLP

(57) ABSTRACT

The present invention relates to a clustering method for rosette scan images, comprising the steps of: (a) obtaining a subject image according to its rosette pattern; (b) converting the location information among the data of the subject image and arraying the converted information into a two-dimensional memory; (c) reading the image data arrayed in the two-dimensional memory from the first row and defining a portion of the data with continuous 1's as a partial cluster; (d) storing multiple partial clusters created upon the completion of the step (c) with respect to the said two-dimensional memory to the end; (e) examining the adjacency among the created multiple partial clusters; and (f) binding the adjacent partial clusters detected in the step (e) as an independent cluster.

6 Claims, 5 Drawing Sheets

CLUSTERING METHOD FOR ROSETTE SCAN IMGES

BACKGROUND OF THE INVENTION

1. Field of the Invention

The present invention relates to the clustering method for rosette scan images. In particular, the present invention relates to the method to array the image pixels obtained according to the rosette pattern in a two-dimensional memory, define partial clusters from the said memory with the array, and to generate clusters from the said defined partial clusters.

2. Description of the Related Art

The rosette scan image is an image formed by a single element detector's scanning of the total field of view by the rosette pattern. The rosette scan image is frequently used by the infrared guided missile's detector for distinguishing the real target from false targets such as flares. The rosette seeker, through the counter-rotation of the two optical elements, provides a two-dimension scan image of a target as if an infrared detector scanned the entire field of view according to the rosette pattern.

Because a rosette seeker may obtain information regarding the size or the spatial position of the target from the detected scan image, the reaction to the target, background, clutter or to flare may be differentiated. The scanning speed of the rosette pattern is higher at the center part of petals than at the outer ends of petals. Also, more scanning lines pass the center part of the pattern than the outer parts of the pattern. Due to the difference in the scanning speed and the non-linear characteristic of the rosette pattern, the detected image differs depending on the location of the subject matter within the field of view.

Furthermore, because a rosette seeker obtains the infrared image by a single element detector's scanning, the rosette scan image has only a narrow distribution of gray scale unlike the ordinary camera image. Thus, it has been necessary to develop a signal processing method to react properly to the detected image's changes depending on the target's position and to correctly recognize targets such as flares.

The conventional rosette seeker has used the K-means clustering as a clustering method to differentiate images existing in the total field of view. However, the K-means clustering generates a different clustering result depending on the seed point of an initial cluster. Furthermore, the number of clusters must be determined prior to the initiation of the relevant algorithm. Thus, if a target discharges a random number of flares as countermeasures, the missile using the said method may fail to track the target. The ISODATA (Iterative Self Organizing Data Analysis Technique) method resolves such problems. The ISODATA clustering method, instead of specifying the number of clusters prior to the initiation of the algorithm process, determines the number of clusters while the algorithm is processed. Accordingly, regardless of the number of flares, all the clusters may be identified. However, as the seeker approaches the target, the number of detected clusters increases accordingly. Thus, values of the merging and splitting parameters must be modified frequently. Therefore, the ISODATA method has a drawback in that the processing time is extended as the relevant algorithm is repeated and the parameters must be modified during the tracking.

SUMMARY OF THE INVENTION

In order to resolve the above-described problems in the conventional clustering methods, the present invention intends to provide a clustering method to array image pixels, which have been obtained by a rosette pattern, in a two-dimensional memory and to cluster the image using the continuity of the data in the said memory, dispensing with the need for a seed point or the merging and splitting parameters.

DETAILED DESCRIPTION OF THE PREFERRED EMBODIMENTS

Reference will now be made in detail to the preferred implementation of the present invention's clustering method for rosette scan images as illustrated in the accompanying drawings.

First, the rosette scan pattern will be explained with the reference to FIG. 1.

A rosette scan pattern is formed by having two optical elements rotate to the opposite directions according to certain rules with a constant rate. If rotational frequencies for two prisms are f1 and f2, the rosette pattern created therefrom may be expressed with the following Equation 1.

$$x(t) = \frac{\delta}{2}(\cos 2\pi f_1 t + \cos 2\pi f_2 t) \quad \text{[Equation 1]}$$
$$y(t) = \frac{\delta}{2}(\cos 2\pi f_1 t - \cos 2\pi f_2 t)$$

In the foregoing Equation 1 δ is the refractive index of the prism.

The ratio of $f_1$ to $f_2$ ($f_1$ and $f_2$, being the said rotational frequencies) determines the scan speed, total number of petals, width of the petal and location of the intersection points of adjacent petals. The relationship of these frequencies is as set forth in the following Equation 2.

$$\frac{N_2}{N_1} = \frac{f_2}{f_1} \quad \text{[Equation 2]}$$

In the foregoing Equation 2, $N_1$ and $N_2$ are positive integers and $f_1$ is greater than $f_2$.

Only when the ratio of Equation 2 is always a rational number and when $f_1$ and $f_2$ have a greatest common measure $f(N_1=f_1/f;$ and $N_2=f_2/f)$, a completely closed rosette pattern may be formed according to Equation 1. In such an event, the frame frequency of the rosette pattern may be expressed with the following Equation 3.

$$T = \frac{1}{f} = \frac{N_1}{f_1} = \frac{N_2}{f_2} \quad \text{[Equation 3]}$$

The total number of petals in a rosette pattern is determined by the following Equation 4. The parameter representing the width of a petal constituting the rosette pattern is as set forth in the following Equation 5.

$$N = N_1 + N_2 \quad \text{Equation 4}$$

$$\Delta N = N_1 - N_2 \quad \text{Equation 5}$$

Figure 1A:
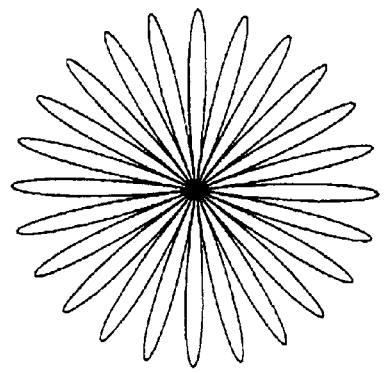
FIG. 1 is a rosette pattern created according to N1, N2 and ΔN.
Figure 1B:
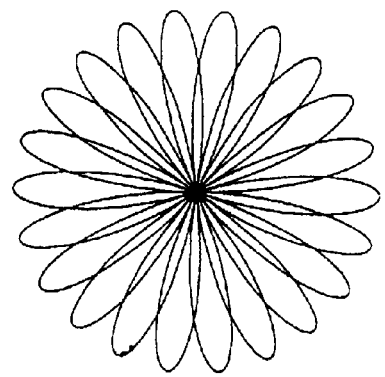

FIG. 1a illustrates a rosette pattern where $N_1$ is 13, $N_2$ is 11 and $\Delta N$ is 2. FIG. 1b illustrates a rosette pattern where $N_1$ is 13, $N_2$ is 9 and $\Delta N$ is 4. As illustrated in FIG. 1, as the value of $\Delta N$ increases, the width of a petal increases. As $\Delta N$'s value decreases, the width of a petal decreases accordingly.

Figure 2:
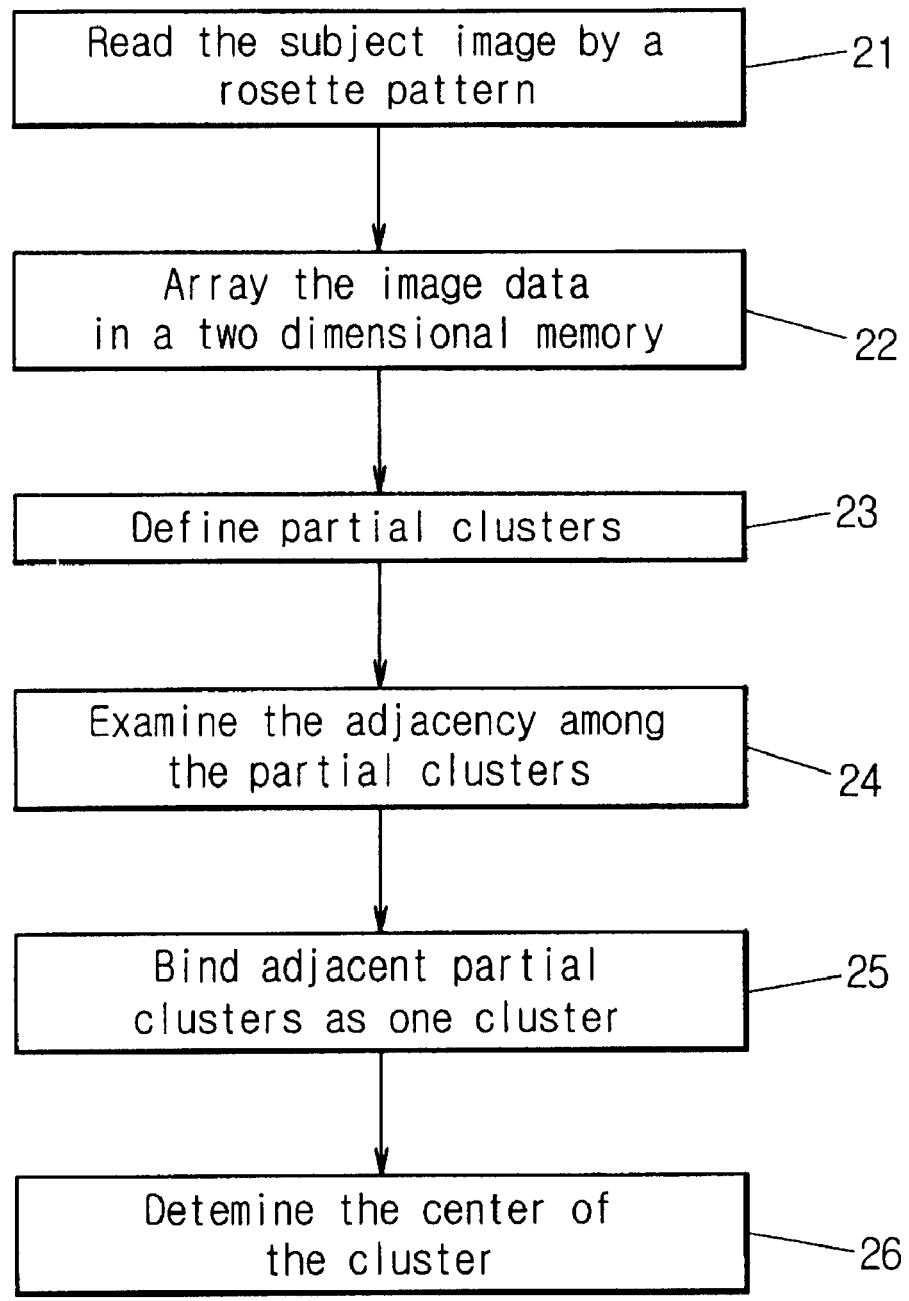
FIG. 2 is a flow chart illustrating a preferred embodiment of the clustering method for rosette scan images.

FIG. 2 is a flow chart illustrating a preferred embodiment of the clustering method for rosette scan images.

As illustrated in FIG. 2, first, the subject image is obtained by a rosette pattern (21). The subject image that has been obtained by a rosette pattern is stored with different values for sample points corresponding to the gray level of such sample points. For instance, the data representing the obtained subject image may have values ranging from 0 to 255 corresponding to the gray level. According to a preferred embodiment of the present invention, the objective is not to exactly recognize the subject image but to detect the existence of a target within the subject image. A certain standard is set in order to achieve such objective. If the gray level in the subject image is higher than the standard, it is determined that a target exists and in contrast, if the gray level is lower than the standard, it is determined that a target does not exist. As a consequence, a subject image seeker level has the value 1 if an image exists or 0 if no image exists in the relevant location. In other words, the pixels corresponding to the positions where a target is detected have 1s as their values and the other pixels have 0s as their values.

Figures 3, 4:
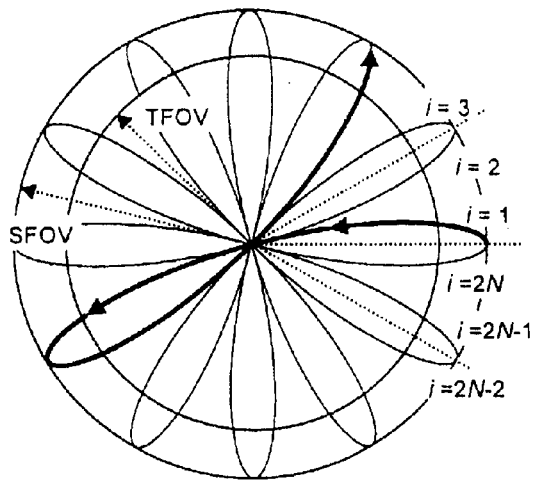
FIG. 3 is an illustration of a rosette pattern to explain the method to rearrange the rosette pattern as two-dimensional data.
FIG. 4 is an illustration of the array of image pixels into a two-dimensional memory.

FIG. 3 is an illustration of a rosette pattern to explain the method to rearrange the rosette pattern as two-dimensional data.

The image pixels obtained at the sampling times are arranged according to a non-linear pattern. Thus, such pixels have the form of one-dimensional array instead of a two-dimensional array. However, because petals in a rosette pattern are formed in the order represented by the thick solid line of FIG. 3, the continuity of pixels may not be examined with such one-dimensional array. Thus, after a pattern is completely created, the one-dimensional array for each petal is rearranged so that the relevant data may be stored in a two-dimensional memory on a two-dimensional space (22). In order to minimize the non-linear characteristic of the rosette pattern, it is recommended that a pattern, which does not have any petal over other petals in the pattern, be rearranged for such purpose.

The method to rearrange a rosette pattern will be explained in the following. First, as set forth in the following Equation 6, the number of sampling points required for forming a rosette pattern, $N_T$, is defined to be the amount 2 to the power of k ($2^k$), multiplied by 2N. The number of sampling points is made to be a multiple of 2 to the power of k in order to array the pattern into a memory space with $2^k$ columns.

$$N_T = 2N \cdot 2^k \quad \text{Equation 6}$$

In the foregoing Equation 6, k is 1, 2 . . . , and N is the total number of petals in a rosette pattern. In order for a rosette pattern to be rearranged as a two-dimensional array, the sample time $\Delta t$ must be determined according to the following Equation 7.

$$\Delta t = \frac{1}{f \cdot N_T} \quad \text{[Equation 7]}$$

In the foregoing Equation 7, f is the frame frequency required for forming a rosette pattern.

In order to convert a rosette pattern to a two-dimensional array, each petal is divided into halves along the central line of each petal including the central point of the rosette pattern and the outer end point of the petal. The value of i for the upper half of the petal in which the rosette pattern starts to be created is 1. Then, the value of i increases one by one counterclockwise. Each row of i rows is composed of j instantaneous sampling point ($N_j$). Thus, the values of i and j of the relevant array are determined from the sensor's instantaneous position. The value of i corresponds to the row number and j the column number in the two-dimensional memory.

The value of i is determined by the following Equation 8.

$$i = \left[\frac{\theta(t)N}{\pi}\right] + 1, \text{ if } \theta(t) \geq 0, \quad \text{[Equation 8]}$$

$$i = \left[\frac{\theta(t)N}{\pi} + 2\pi\right] + 1, \text{ if } \theta(t) < 0.$$

In the foregoing Equation 8, i ranges from 1 to 2N (i=1, 2, . . . 2N). $\theta(t)$ is the angle of the detector's instantaneous position represented with polar coordinates. Each column is composed of $2^k$ samples out of the samples in the entire pattern. Thus, j ranges from 1 to $2^K$ (j=1,2, . . . $2^k$). If j begins with the sampling point at the center of the subject pattern and ends at the outer end of a petal, the value of j may be determined pursuant to the following Equation 9.

$$j = (1+D)2^k - N_j + 1, \text{ if } D \text{ is odd},$$

$$j = N_j - 2^k D, \text{ if } D \text{ is even}. \quad \text{Equation 9}$$

In the foregoing equation 9, D equals $$D = \left[\frac{N_j}{2^k}\right],$$

where $N_j = 1, 2, \ldots N_T$.

During one cycle of the rosette scanning, the information about an object detected by an infrared sensor is stored in a memory through the functions of Equations 8 and 9. If any object is detected during the rosette scanning, the relevant memory cell of an array is filled with 1. In other cases, 0s are stored. When one cycle of scanning is completed, an array of i by j (i×j) is created in the memory. FIG. 4 is an illustration of such array of image pixels stored in a memory.

When the step of arraying the image data into a two-dimensional memory is completed as illustrated in FIG. 4, partial clusters are defined in each row (23).

Before the method to define partial clusters is explained, the meanings of the terms used in such explanation are set forth as follows.

$S_1$ is the lth partial cluster. i is the row number and j the column number. $x_{ij}$ is the pixel value of an element (i, j) in the array. $n(S_1)$ is the number of elements included in the lth partial cluster. $N_r$ is the minimum number of elements that one partial cluster may contain and this number is determined appropriately under the relevant circumstances.

Partial clusters are defined by determining whether there are continuous data with 1s as their values, beginning with the $1^{st}$ row (i.e., i=1). First, l, j and i are initialized with the value 1. Then, in the first row (i=1), the values of $x_{ij}$ are examined as the value of j increases from 1 to $2^k$. If $x_{ij}$ has the value 1 continuously, such element having the value 1 continuously is defined to be in a partial cluster, and i and j of such element is contained in $S_1$, provided that the number of such continuous 1s must be greater than the predetermined $N_r$. The said process of including the relevant element in $S_1$ continues until the next pixel has the value 0. The partial cluster which is first defined in the first row becomes $S_1$. Partial clusters are defined for each row but more than one partial clusters may be formed in one row. As illustrated in the first row of FIG. 4, if more than one portion of a row has continuous 1s as their values, each of such portions is defined as an independent partial cluster. In FIG. 4, the first three continuous 1s in row 1 becomes $S_1$. The two continuous 1s that come next in the first row becomes $S_2$.

When the above-described process is repeated until it comes to the last row i, partial clusters such as the one in the following Equation 10 will have been defined.

$$S_l = [(i_1, j_1)_l (i_2, j_2)_l \ldots (i_n, j_n)_l] \quad \text{Equation 10}$$

In the foregoing Equation 10, n means the number of elements contained in the lth cluster.

After partial clusters are defined as described above, it is examined whether partial clusters are adjacent to each other (24). Then, adjacent partial clusters are bound to become one independent cluster (25). According to the preferred embodiment of the present invention, the above two steps are conducted [simultaneously]. The adjacency of partial clusters is determined by examining whether an element of a partial cluster in a row is adjacent to an element of another cluster in a different row. This process is explained in detail in the following.

The universal set including all of the partial clusters is named $U=[S_1, S_2 \ldots S_l]$. An independent cluster combining adjacent partial clusters is named $C_p$. The examination of the partial clusters' adjacency begins with p's value 1 (p=1).

The first element of the universal set U is included in $C_p$ and eliminated from U. Then, such condition is represented by the following Equation 11.

$$C_p = [S_1], \; U = [S_2, S_3, \ldots S_l] \quad \text{Equation 11}$$

In the foregoing Equation 11, an element $(i_m, j_m)_p$ in $C_p$ and the lth partial cluster element $(i_n, j_n)_l$ are examined for the adjacency according to the method represented by the following Equation 12. The lth partial element to be included in $C_p$ is eliminated from U.

$$S_l \in C_p \text{ and } U - S_l \text{ if } |(i_m, j_m)_p - (i_n, j_n)_l| = (1,0) \quad \text{Equation 12}$$

As indicated in the foregoing Equation 12, the adjacency is determined when the difference between an element included in $C_p$ and an element of a partial cluster in U is 1. In other words, with respect to such elements, when the relevant rows are adjacent to each other and when the column number is same, the relevant partial clusters are bound into a single independent cluster. As illustrated in the foregoing Equation 12, the partial clusters determined to be adjacent to other clusters are eliminated from the universal set U.

If there is no more element in U that satisfies the condition of Equation 12, p is increased by one. This process is repeated until there is no more remaining element in U.

As illustrated in FIG. 3, in a rosette pattern, the first row and the 2Nth row (row i=1 and row i=2N) are actually adjacent to each other even though they are located apart in the memory space. Thus, the adjacency between these two rows is examined according to the following Equation 13.

$$C_r \cup C_s, \text{ if } |(i_r, j_r) - (i_s, j_s)| = (2N, 0) \quad \text{Equation 13}$$

In the foregoing Equation 13, r's value is 1, 2, . . . p−1 (r=1,2, . . . p−1) and s's value is r+1, . . . p (s=r+1, . . . p) (r≠s).

When the step of examining the adjacency among partial clusters and binding adjacent partial clusters into one cluster is completed, the cluster array stored in the memory is converted into values with actual x and y coordinates. Then, the center of each cluster is determined (26).

Figure 5A:
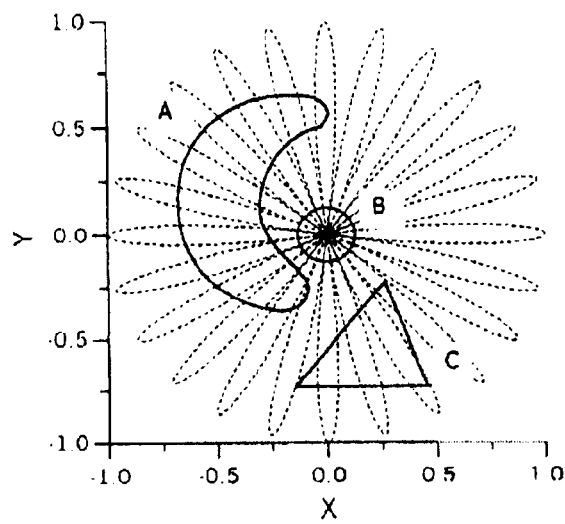
FIG. 5a is an original input image.
Figure 5B:
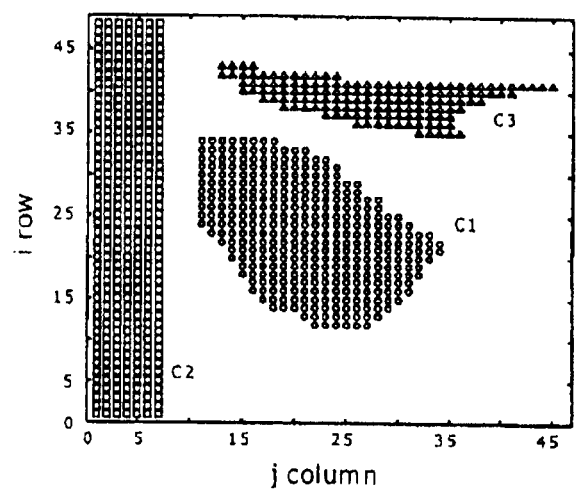
FIG. 5b is an image in which clusters are created by the array in the two-dimensional memory.
Figure 5C:
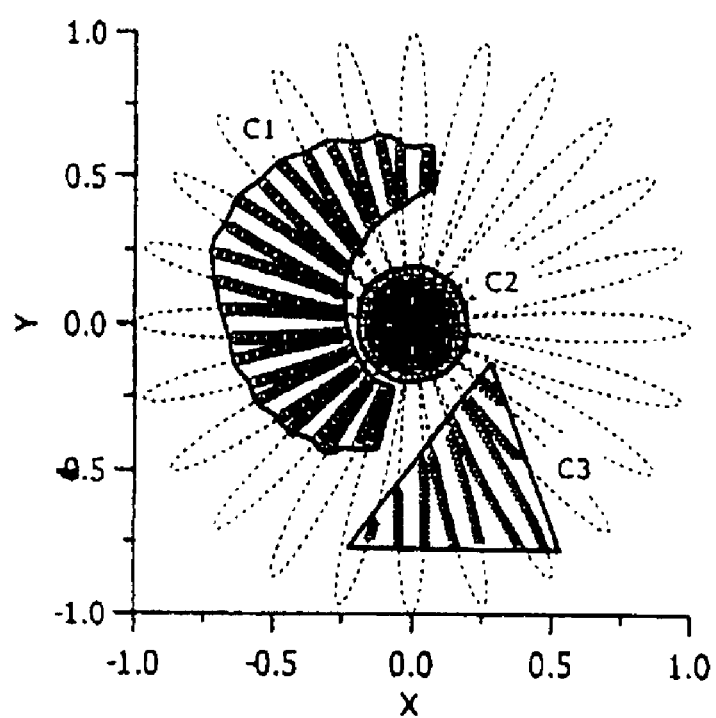
FIG. 5c is an illustration of the clusters in the two-dimensional memory of FIG. 5b, arrayed according to their actual coordinates.

FIG. 5a is an original input image; FIG. 5b is an image in which clusters are formed by the array in the two-dimensional memory; and FIG. 5c is an illustration of the clusters in the two-dimensional memory of FIG. 5b, arrayed according to their actual coordinates.

The step of arraying the clusters in a memory into the actual coordinates is conducted by multiplying each cluster array by the x and y array. As evidenced in FIG. 5, the present invention's clustering method may sufficiently reflect the number and the shape of the actually inputted image. The center of each cluster is determined after the clusters are rearranged in the actual coordinates as illustrated in FIG. 5c.

According to the present invention's clustering method for rosette scan images, it is not necessary to select an initial seed point as in the conventional ISODATA method or K-means method, and there is no concern about the difference in clustering results depending on the selection of the seed points. Furthermore, it is not necessary to fix the number of clusters. Also, because the clustering is conducted using the continuity of the memory number in which a pixel is stored, it is not necessary to have the merging and splitting parameters of clusters, which are necessary for the ISODATA method. Accordingly, all the clusters contained in a subject image may be separated conveniently and the calculation may be simplified.

What is claimed is:

1. A clustering method for rosette scan images, comprising the steps of:

(a) obtaining a subject image according to a rosette pattern;

(b) arraying the obtained image data into a two-dimensional memory by converting the location information of the data;

(c) reading the image data stored in the two-dimensional memory in an orderly manner from the first row and defining partial clusters if the data have ones (1s) continuously as their values;

(d) storing the partial clusters created upon the complete performance of said step (c) until the end of the two-dimensional memory;

(e) examining the adjacency among the created partial clusters; and (f) binding the adjacent clusters detected in said step (e) into one independent cluster.

2. The clustering method for rosette scan images according to claim 1, further comprising the step (g) of rearranging the clusters bound in said step (f) according to the x and y coordinates of the subject image and determining the center of each cluster.

3. The clustering method for rosette scan images according to claim 1, wherein said step (b) of arraying the subject image into a two-dimensional memory further comprises the steps of:

determining the relevant row in the two-dimensional memory for the image data, through the instantaneous location θ(t) of the image data obtained said step (a) and the total number of leaves of the rosette pattern, by a mathematical formula of $$\left[\frac{\theta(t)N}{\pi}\right]+1$$

in the event of θ(t)≧0, or $$\left[\frac{\theta(t)N}{\pi}+2\pi\right]+1$$

in the event of θ(t)<0; and determining the relevant column in the two-dimensional memory for the image data, where each sample point is $N_j$ and D equals $$\left[\frac{N_j}{2^k}\right],$$

by a mathematical formula of $(1+D)2^k - N_j + 1$ in the event that D is an odd number or $N_j - 2^k D$ in the event that D is an even number.

4. The clustering method for rosette scan images according to claim 1, wherein the partial clusters are defined for each row of the two-dimensional memory.

5. The clustering method for rosette scan images according to claim 1, wherein said step (e) of examining the adjacency is performed by examining whether the partial clusters defined in each row are adjacent to other partial clusters in the neighboring rows.

6. The clustering method for rosette scan images according to claim 4, wherein said step (e) of examining the adjacency is performed by examining whether the partial clusters defined in each row are adjacent to other partial clusters in the neighboring rows.

* * * * *

UNITED STATES PATENT AND TRADEMARK OFFICE
CERTIFICATE OF CORRECTION

PATENT NO. : 6,807,307 B2 Page 1 of 1
DATED : October 19, 2004
INVENTOR(S) : Jahng et al.

It is certified that error appears in the above-identified patent and that said Letters Patent is hereby corrected as shown below:

Title page,
Item [54], Title, change "IMGES" to -- IMAGES --.

Signed and Sealed this

Twenty-first Day of December, 2004

JON W. DUDAS
*Director of the United States Patent and Trademark Office*